United States Patent [19]
Budd et al.

[11] Patent Number: 4,578,411
[45] Date of Patent: Mar. 25, 1986

[54] PROCESS FOR MAKING POWDERED RUBBER

[75] Inventors: William Budd, Cuyahoga Falls; Paul H. Sandstrom, Tallmadge, both of Ohio

[73] Assignee: The Goodyear Tire & Rubber Company, Akron, Ohio

[21] Appl. No.: 649,233

[22] Filed: Sep. 10, 1984

[51] Int. Cl.$^4$ ............................................... C08K 3/04
[52] U.S. Cl. .................................. 524/156; 523/206; 523/334; 524/496; 524/526; 428/407
[58] Field of Search ...................... 524/156, 575, 526; 523/352, 206, 334; 428/407

[56] References Cited

U.S. PATENT DOCUMENTS

| | | | |
|---|---|---|---|
| 3,813,259 | 5/1974 | Neubert | 427/222 |
| 3,920,604 | 11/1975 | Berg et al. | 524/534 |
| 3,945,978 | 3/1976 | Berg et al. | 524/571 |
| 4,073,755 | 2/1978 | Berg et al. | 524/575 |
| 4,374,941 | 2/1983 | Sandstrom | 524/495 |
| 4,375,497 | 3/1983 | Sandstrom | 524/525 |
| 4,379,871 | 4/1983 | Werle et al. | 524/495 |

Primary Examiner—Herbert J. Lilling
Attorney, Agent, or Firm—Alvin T. Rockhill

[57] ABSTRACT

The conventional processing of rubbers into shaped articles of manufacture normally include a compounding step. In this compounding step the rubber is mixed with fillers, curatives, and various other additives so as to obtain a homogeneous mixture. The relatively high viscosity of these raw materials makes it necessary to utilize heavy machinery, such as Banbury mixtures, which consume large amounts of energy in the mixing procedure.

The present invention provides an improved process for the production of tack-free, pourable, filler containing powdered rubber. This powdered rubber can be compounded eliminating in whole or in part the need for heavy equipment which consumes high amounts of energy. This invention more specifically reveals that in a process for the production of tack-free, pourable, filler containing elastomer powder which comprises;

(a) dispersing a carbon black filler in water;
(b) mixing the thus dispersed carbon black filler with an elastomer solution and a surfactant to produce an elastomer emulsion;
(c) coagulating the emulsion;
(d) partitioning the coagulated elastomer emulsion with a coating resin which is comprised of at least one copolymer containing from 70% to 97% by weight vinyl aromatic monomers and from 3% to 30% by weight diene monomers; and
(e) filtering, washing and drying the resultant powder.

18 Claims, No Drawings

PROCESS FOR MAKING POWDERED RUBBER

BACKGROUND OF THE INVENTION

The processing of rubbers into shaped objects is normally a multistage procedure. In contradistinction to the manufacture of molded components from thermoplastic synthetic resins, it is normally necessary, prior to the final shaping step, to conduct generally complicated mixing procedures to obtain a homogeneous incorporation of diverse additives, such as cross-linking agents. The relatively high viscosity of these raw materials makes it necessary to utilize heavy machinery such as rolling mills or internal mixers, which consume large amounts of energy. The inherent costs of this energy and equipment are considerable and greatly impair the economy of the production of elastomeric materials.

The statistical distribution homogeneity required of the various components in the elastomer mixtures requires a considerable expenditure of time and energy in addition to high investment costs. During the solid state homogenization, the rubber particles and filler particles are displaced with respect to one another against a strong resistance. Even those portions of the mixture which already have been sufficiently intermixed must still participate in the mixing procedure until a satisfactory dispersion of the entire mixture has been accomplished. The frictional heat generated requires a discontinuous mode of operation. In order to avoid or minimize the danger of premature vulcanization, the vulcanizing agents or a portion thereof are not added until a second operating step. However, the preparation of cross-linkable elastomers sufficiently stable for even intermediate storage periods requires expensive measures and is effected, in modern large-scale plants, by expensive pelletizing and storage in rotating containers. Further processing, involves the subsequent preparation of a blank on calenders and/or extruders, depending on the type of the finished article. The subsequent conventional vulcanization in presses or autoclaves completes the manufacturing process.

In order to avoid large energy expenditures, to eliminate the need for expensive mixing equipment, such as Banbury mixers, and to allow for the use of automated equipment in the handling of rubbers during processing pulverulent elastomeric mixtures have been developed. In fact, a large number of published references deal with such powdered rubbers. However, even though they offer many advantages powdered rubbers are not widely used today and only recently have methods been disclosed for making pulverulent pourable elastomer mixtures, such as rubber/carbon black mixtures.

U.S. Pat. No. 3,920,604 and U.S. Pat. No. 3,945,978 describe processes of preparing an elastomer containing a filler by emulsifying a solvent solution of the elastomer and the filler, flashing off the solvent and coagulating the mixture to a pourable powder.

Also of interest is U.S. Pat. No. 4,073,755, which describes a process for the production of pulverulent, tack-free, pourable filler-containing elastomer particles by precipitating a stable emulsified homogeneous mixture of an aqueous elastomer emulsion and an aqueous dispersion of a solid filler in the presence of sodium silicate, separating the thus precipitated elastomeric mixture from water and drying the mixture to a tack-free powder. Although this method initially gives a tack-free powder, the powder tends to conglomerate on storage when exposed to the atmosphere. This is probably caused by the silicic acid used to coagulate the mixture. After coagulation the resultant acid solution is neutralized to form a salt which is partly incorporated in the elastomer-filled powder and is not readily removed even by washing. When exposed to the atmosphere the resultant salt deliquesces causing the particles to conglomerate.

A method making a resin encapsulated elastomer is described in U.S. Pat. No. 3,813,259. In that invention the rubber is coated with a resin partitioning agent by agglomerating the resin from its latex at a specific temperature which must be within 5° C. of the agglomeration temperature of the resin. This temperature is critical for the adherence of the resin coating to the elastomer.

U.S. Pat. No. 4,375,497 discloses a process for the production of tack-free, pourable, filler containing elastomer powder which comprises;
(a) dispersing a carbon black filler in water;
(b) mixing the thus dispersed carbon black filler with an elastomer latex;
(c) coagulating the thus produced mixture of elastomer latex and carbon black with an acid/alum solution:
(d) partitioning the thus coagulated suspension with a coating resin: and
(e) filtering, washing and drying of the resultant powder, wherein the coating resin is comprised of a styrene/butadiene resin and a styrene/α-methylstyrene resin or a polystyrene resin.

SUMMARY OF THE INVENTION

The present invention relates to an improved process for the production of tack-free, pourable, filler containing powdered rubber. This pulverulent elastomer when exposed to the atmosphere on storage remains dry and does not conglomerate. This invention also reveals a process which incorporates carbon black into the elastomer without the use of high energy equipment.

This invention more specifically reveals that in a process for the production of tack-free, pourable, filler containing elastomer powder which comprises;
(a) dispersing a carbon black filler in water;
(b) mixing the thus dispersed carbon black filler with an elastomer solution and a surfactant to produce an elastomer emulsion;
(c) coagulating the elastomer emulsion;
(d) partitioning the coagulated elastomer emulsion with a coating resin which is comprised of at least one copolymer containing from 70% to 97% by weight vinyl aromatic monomers and from 3% to 30% by weight diene monomers: and
(e) filtering, washing and drying the resultant powder.

DETAILED DESCRIPTION

The elastomers to which this invention is particularly applicable are synthetic elastomeric polymers (rubbers) in the form of solutions. Representative of these polymers are styrene/butadiene rubbers, acrylontrile-/butadiene rubbers, polypropylene rubbers, polybutadiene rubbers, polyisoprene rubbers, and copolymers of dimethyl butadiene/butadiene rubbers. As previously noted the elastomers are in the form of a solution. The elastomers may be oil-extended and contain other ingredients such as antioxidants.

The carbon black fillers used in this invention are generally the reinforcing type such as high abrasion furnace (HAF), intermediate super abrasion furnace (ISAF), and fast extrusion furnace (FEF). The carbon, if pelletized, must first be reduced to a powdered form from the usual pelletized form. This is done by mixing the pelletized carbon black with the water and with or without dispersant in a high speed mixer. The amount of carbon black which is added to an elastomer as a filler will generally range between about 10 and 100 phr. Although the carbon black can be dispersed without dispersant, a dispersant may be used. If a dispersant is employed, a purified free acid pine lignin dispersant (Indulin TM AT) is generally used at a concentration of 0.05 to 2 weight percent based on the total weight of the carbon black, preferably from 0.1 to 0.3 weight percent. The lignin dispersant can be solubilized with a small amount of NaOH.

The dispersed carbon black is then incorporated into the elastomer solution along with an anionic surfactant, such as Ultrawet K. Vigorous agitation is applied throughout this step until a creamy stable emulsion (elastomer emulsion) is formed. The use of this surfactant during this procedure prevents the conglomeration of the dried elastomeric product and the formation of any free carbon black.

The coating resins used in practicing this invention are copolymers of vinyl aromatic monomers and diene monomers. These copolymer resins contain from 70% to 97% by weight vinyl aromatic monomers and from 3% to 30% by weight diene monomers. It is more preferred for these copolymer resins to be derived from 80% to 95% vinyl aromatic monomers and from 5% to 20% diene monomers. The most preferred coating resins for use in the practice of this invention will contain about 90% by weight vinyl aromatic monomers and about 10% by weight diene monomers. The vinyl aromatic monomers which can be used in the coating resins of this invention generally contain from 8 to 16 carbon atoms. Some representative examples of such vinyl aromatic monomers include styrene, α-methyl styrene, vinyl toluene, 3-methyl styrene, 4-methyl styrene, 4-cyclohexyl styrene, 4-para-tolyl styrene, para-chloro styrene, 3-vinyl α-methyl styrene, 4-vinyl α-methyl styrene, 1-vinyl naphthalene, 2-vinyl naphthalene, and the like. The preferred vinyl aromatic monomers for use in the coating resins of this invention are styrene, α-methyl styrene, and vinyl toluene. Styrene is generally the most preferred vinyl aromatic monomer.

The diene monomers which are used in the coating resins of this invention are generally conjugated diolefins. Some representative examples of some suitable conjugated diolefins include 1,3-butadiene, isoprene, 2,3-dimethyl-1,3-butadiene, 2-ethyl-1,3-butadiene, 1,3-pentadiene, 2-methyl-1,3-pentadiene, 1,3-hexadiene, 2-phenyl-1,3-butadiene, 1,3-heptadiene, 1,3-octadiene, 3-methyl-1,3-pentadiene, 4-methyl-1,3-pentadiene, and the like. The preferred conjugated diolefins for use in the coating resins of this invention are 1,3-butadiene and isoprene with 1,3-butadiene being the most preferred.

These copolymers are utilized as a latex with a solids content of about 1 to about 20 weight percent, preferably 2 to 10 weight percent. As little as 2 parts of the copolymer coating resin per hundred parts of the rubber (phr) by weight will give a free flowing powder with no free resin, no conglomeration of the powders, high density and small particle size distribution. Up to 8 phr of the copolymer can be used as the coating resin but its use in quantities that large is usually unnecessary. Thus, normally from 2 to 12 parts of the coating resin will be employed per 100 parts of the rubber (elastomer). In most cases from 4 to 9 parts of the coating resin will be employed per hundred parts of the rubber.

One or more surfactants can be added to the copolymer which is utilized as the coating resin in order to prevent it from becoming dislodged from the rubber particles and thus, allowing the finished product to contain free resin. It has been determined that a combination of sodium lauryl sulfate (SLS) and a nonionic type surfactant work exceptionally well for this purpose. Isoctyl phenoxy polyethoxy ethanol which contains about 10 moles of ethylene oxide in the polyethoxy portion thereof and which is sold commercially as Triton TM X-100 can be used as the nonionic type surfactant. The surfactant or mixture of surfactants can be added to the coating resin in concentrations of 3 to 8 weight percent based upon the total weight of the rubber. A mixture of sodium lauryl sulfate and a nonionic type surfactant having a weight ratio sodium lauryl sulfate to the nonionic type surfactant of 2/1 to ½ is an excellent choice as the surfactant.

The elastomer emulsions of this invention can be coagulated by using an acid/alum coagulant. In fact, the use of acid/alum as a coagulant is well known in the art. The elastomer emulsion can be coagulated by the use of a dilute acid/alum solution at a pH 2-4 at various temperatures and ratios of alum to elastomer. The temperature of coagulation can vary from about 50° C. to about 70° C. and the concentration of the alum varies between 2-20 parts per hundred rubber. The preferred temperature is from 60° C. to 65° C. and the preferred concentration of alum is 3-15 parts per hundred of rubber. The concentration of the alum solution may vary between 0.1 to 1%. The coagulated elastomer-filler particles should be maintained as an aqueous slurry during the coating process. This resin coating is generally done at a temperature of 80° C. to 100° C. and is preferably done at a temperature of 90° C. to 95° C.

The desired results of this invention are obtained when the coating resin coagulates on the elastomer-filler particles in the slurry. This is achieved by adding the latex of the coating resin to the dilute coagulant 0.01 to 2 percent by weight in the water in which the particles are slurried.

The coagulation temperature is not required to be within 5° C. of the agglomerating temperature of the coating resins. Thus, less heat energy is used to produce free-flowing powders having resin coatings of high heat distortion temperatures which should exhibit better storage stability. The procedure outlined in U.S. Pat. No. 3,813,259 would require temperatures at or above 100° C. to effectively coat the powders with resins of the styrene/α-methylstyrene copolymer type. Even if one considers the case where the ratio of styrene to α-methylstyrene is 100/0, which is polystyrene, the agglomeration temperature of 106° C. as presented in U.S. Pat. No. 3,813,259 would require a resin coating step process at temperatures of about 100° C., which is clearly above the preferred temperature range of this invention of 90° to 95° C.

The resin elastomer-filler particles of this invention after drying form free-flowing powders which at least 90 percent by weight are below 1 mm in size. Those exhibiting greater than 10 percent by weight above 1 mm are defined in this invention as being conglomerated. Conglomeration is considered to take place when several of the primary particles from the coagulation step are fused together during the drying process.

This invention is illustrated by the following examples which are merely for the purpose of illustration and are not to be regarded as limiting the scope of the invention or the manner in which it may be practiced. Unless specifically indicated otherwise, parts and percentages are given by weight.

EXAMPLE 1

A dispersion of carbon black in water containing Indulin TM AT and sodium hydroxide was prepared by mixing 15.3 grams (g) of carbon black, 0.05 g of Indulin TM AT, 0.005 g of sodium hydroxide, and 148.2 g of water for approximately 15 seconds at slow speed in a one liter Waring blender. This carbon black dispersion was mixed into 238.5 g of Natsyn TM 2200 (high cis-1,4-polyisoprene marketed by The Goodyear Tire & Rubber Company) cement which had been previously diluted to 8 weight percent total solids with hexane. A 10% water solution of the surfactant Ultrawet K was then added with vigorous agitation being applied with a 3 inch diameter six-blade turbine. The agitation was continued for about 2½ minutes until a creamy stable emulsion was formed. This elastomer emulsion contained 238.5 g of Natsyn 2200, 15.3 g of carbon black, 0.05 g of Indulin TM AT, 0.005 g of sodium hydroxide, 1.2 g of Ultrawet K, and 159 g of water.

This elastomer emulsion was added over a 30 to 45 minute period to an alum solution under vigorous agitation using a six-bladed turbine with 3 inch blades operated at 1300 rpm in a 6 inch diameter reactor with 4 baffles to produce a fine powder. The temperature was maintained at 62° C. to 64° C. to remove hexane solvent and was later raised to 92° C.-94° C. to carry out resin coating. Between 6 and 9 phr (parts per hundred parts of rubber) of the coating resin was used with it being a blend containing 50% of a 90/10 styrene/butadiene copolymer and 50% of a 75/25 styrene/α-methyl styrene copolymer resin. The additional time allowed for the resin coating was between 2 and 5 minutes.

The elastomer powder was then quenched in cold water at 5° C. to 15° C., filtered, washed and dried for 2 to 5 hours in a 60° C.-66° C. forced air oven. This process was successful for making a pourable powdery masterbatch of the high cis-1,4-polyisoprene.

EXAMPLE 2

A carbon black dispersion was prepared by mixing 15.3 g of carbon black, 0.2 g of a 10% Indulin AT solution, and 147.8 g of water for 2 minutes at low speed followed by 1 minute at high speed in a one liter Waring blender. This carbon black dispersion was then mixed into a Natsyn 200 cement which was in a hexane solvent and which had a solids content of 8%. A 10% solution of Ultrawet K was then added. Agitation was applied with a 3 inch six-bladed turbine which was run at 1300 rpm.

The elastomer emulsion prepared in this example contained 238.5 g of Natsyn 200 cement, 15.3 g of carbon black, 147.8 g of water, 0.2 g of the 10% Indulin AT solution, and a 10% Ultrawet K solution. This recipe contained 80 phr of carbon black.

This elastomer emulsion was added over a 30 to 45 minute period to an alum solution with vigorous agitation using a six-bladed turbine with 3 inch blades operated at 1300 rpm in a 6 inch diameter reactor with 4 baffles to produce a fine powder. The temperature was maintained at 62° C.-64° C. to remove hexane solvent and after coagulation the temperature of the slurry was raised to 92° C.-94° C. to carry out the resin coating. The coating resin used for the resin coating was a 90/10 styrene/butadiene copolymer which was employed at a concentration of between 6 and 9 phr. The additional time allowed for the resin frosting was 2-5 minutes.

The elastomer powder was then quenched in cold water at 5°-15° C., filtered, washed and dried for 2-5 hours in a forced air oven at 60°-66° C. This process was successful for making a pourable powdery masterbatch of high cis-1,4-polyisoprene containing 80 phr of carbon black.

EXAMPLE 3

The procedure utilized in Example 2 was also used in this experiment except that the carbon black dispersion was prepared by mixing 9.5 g of carbon black, 92 g of water and 0.2 g of a 10% Indulin AT solution. This procedure resulted in the production of a pourable powdery masterbatch containing 50 phr of carbon black.

EXAMPLE 4

The process described in Example 2 was repeated in this experiment except that the carbon black dispersion was prepared by mixing 5.7 g of carbon black, 57 g of water, and 0.2 g of a 10% Indulin AT solution. This procedure resulted in the formation of a pourable powdery masterbatch containing 30 phr of carbon black.

EXAMPLE 5

A dispersion of carbon black in water containing Indulin TM AT and sodium hydroxide was prepared by mixing 15.3 g of carbon black, 04 g of Indulin TM AT, 0.04 g of sodium hydroxide and 147.8 g of water for approximately 2 minutes in a one liter Waring blender. This carbon black dispersion was mixed into 113.6 g of polybutadiene cement having a solids content of 16.8 weight percent which had been previously diluted to 8 weight percent total solids with hexane. In this example no Ultrawet K surfactant was added. Agitation was continued until a creamy stable emulsion was formed, after about 5 minutes. This elastomer emulsion was added over a 24 to 27 minute period to an alum solution under vigorous agitation conditions as in Example 1. No powder mass was formed. The material agglomerated.

In other experiments done using this procedure cationic and non-ionic surfactants were tried, but they interferred with the coagulation of the coating resins and thus were not satisfactory.

While certain representative embodiments and details have been shown for the purpose of illustrating the invention, it will be apparent to those skilled in this art that various changes and modifications may be made therein without departing from the scope of the invention.

What is claimed is:

1. A process for the production of tack-free, pourable, filler containing elastomer powder which comprises;
   (a) dispersing a carbon black filler in water;
   (b) mixing the thus dispersed cabon black filler with an elastomer solution and an anionic surfactant to produce an elastomer emulsion;
   (c) coagulating the elastomer emulsion;
   (d) partitioning the coagulated elastomer emulsion with a coating resin which is comprised of at least one copolymer containing from 70% to 97% by weight vinyl aromatic monomers and from 3% to 30% by weight diene monomers; and (e) filtering, washing and drying the resultant powder.

2. A process according to claim 1 wherein the coagulation temperature is from 50° C. to 70° C.

3. A process according to claim 2 wherein said elastomer emulsion is coagulated with an acid/alum solution.

4. A process according to claim 3 wherein the coating resin further contains a surfactant.

5. A process according to claim 4 wherein the surfactant is a mixture of sodium lauryl sulfate and a nonionic type surfactant.

6. A process according to claim 5 wherein the surfactant is a mixture of sodium lauryl sulfate and isoctyl phenoxy polyethoxy ethanol which contains about 10 moles of ethylene oxide in the polyethoxy portion thereof and wherein the weight ratio of said sodium lauryl sulfate to said isoctyl phenoxy polyethoxy ethanol is from 2/1 to ½.

7. A process according to claim 6 wherein the concentration of said surfactants is from 4 to 8 weight percent based upon the total weight of said coating resin.

8. A process according to claim 7 wherein the coagulation temperature is from 60° C. to 65° C.

9. A process according to claim 3 wherein the elastomer is selected from the group consisting of styrene/butadiene rubbers, acrylonitrile/butadiene rubbers, polybutadiene rubbers, polyisoprene rubbers, and dimethylbutadiene/butadiene rubbers.

10. A process according to claim 9 wherein the coating resin contains from 80% to 95% vinyl aromatic monomers and from 5% to 20% diene monomers.

11. A process according to claim 10 wherein the aromatic monomers are selected from the group consisting of styrene, α-methyl styrene, and vinyl toluene; and wherein said diene monomers are conjugated diolefins.

12. A process according to claim 10 wherein the coating resin is a copolymer of butadiene and styrene.

13. A process according to claim 12 wherein the copolymer of butadiene and styrene contains about 90% styrene and about 10% butadiene.

14. A process according to claim 10 wherein the carbon black is prepared using a purified free acid pine lignin dispersant in an amount which is from 0.1 to 0.3 percent by weight based upon the weight of the carbon black.

15. A process according to claim 10 wherein from 2 to 8 parts of the coating resin is employed per hundred parts of the elastomer.

16. A process according to claim 10 wherein said elastomer is polyisoprene.

17. A process according to claim 16 wherein from 3 to 6 parts of the coating resin is employed per hundred parts of the elastomer.

18. A process according to claim 10 wherein the coagulated elastomer is partitioned at a temperature of 80° C. to 100° C.

* * * * *